Figure 1:
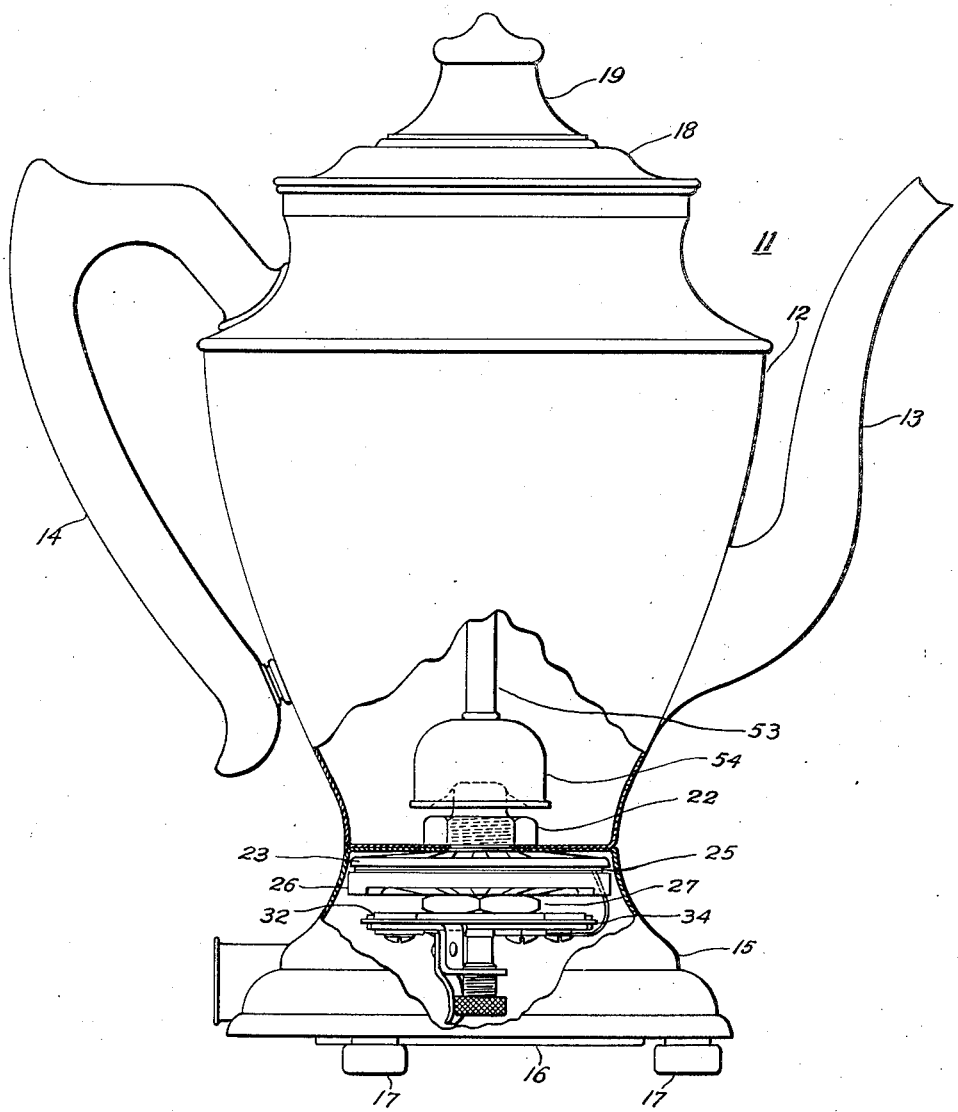

Dec. 1, 1925.

V. G. VAUGHAN

PERCOLATOR HEATER UNIT

Filed Feb. 18, 1924

1,563,458

2 Sheets-Sheet 1

WITNESSES:
Carl J. Loesch
N. M. Biebel

INVENTOR
Victor Graves Vaughan
BY
Wesley G. Carr
ATTORNEY

Dec. 1, 1925.

V. G. VAUGHAN 1,563,458

PERCOLATOR HEATER UNIT

Filed Feb. 18, 1924

2 Sheets-Sheet 2

WITNESSES:
Carl J. Loesch
H. M. Biehel

INVENTOR
Victor Graves Vaughan
BY
Wesley G. Carr
ATTORNEY

Patented Dec. 1, 1925.

1,563,458

UNITED STATES PATENT OFFICE.

VICTOR GRAVES VAUGHAN, OF WILKINSBURG, PENNSYLVANIA, ASSIGNOR TO WESTINGHOUSE ELECTRIC & MANUFACTURING COMPANY, A CORPORATION OF PENNSYLVANIA.

PERCOLATOR HEATER UNIT.

Application filed February 18, 1924. Serial No. 693,568.

*To all whom it may concern:*

Be it known that I, VICTOR GRAVES VAUGHAN, a citizen of the United States, and a resident of Wilkinsburg, in the county of Allegheny and State of Pennsylvania, have invented a new and useful Improvement in Percolator Heater Units, of which the following is a specification.

My invention relates to percolators and particularly to electric heating elements therefor.

The object of my invention is to provide a percolator heating unit comprising a fusible circuit-controlling means, that shall function properly under predetermined conditions of operation of the percolator.

In practicing my invention, I provide a fluid container having tubular members secured thereto and depending therefrom. The tubular member is made of metal having a relatively high heat conductivity, and a flat heating element is pressed against an integral and laterally-extending flange thereof by a clamping plate made of a metal of lower heat conductivity.

A relatively large nut is mounted on the tubular member for operatively engaging the clamping plate, and provides a heat path of relatively high conductivity from the clamping plate to the tubular member. A supporting plate which is clamped against the lower surface of a large clamping nut, carries a fusible means for controlling the circuit of the heating element.

Figure 2:
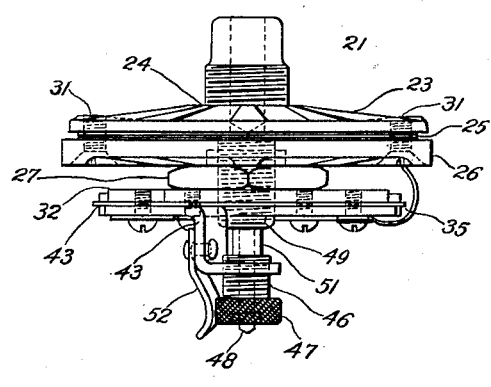
Figure 3:
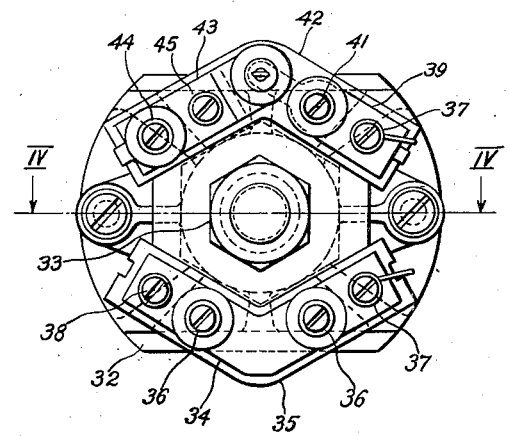
Figure 4:
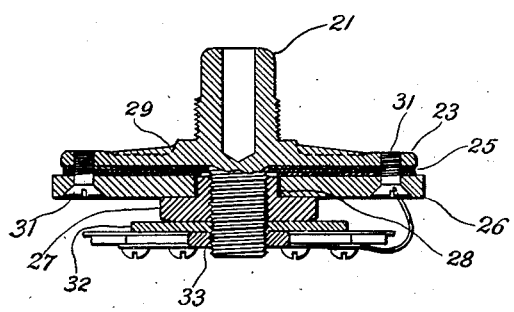
Figure 5:
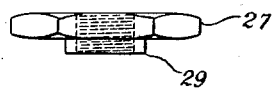
Figure 6:
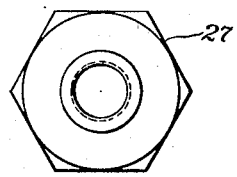

In the drawings,

Figure 1 is a view, in side elevation, of a percolator, a portion thereof being cut away to show the location and construction of the device embodying my invention, Fig. 2 is a view, in side elevation, of a device embodying my invention, Fig. 3 is a bottom plan view thereof, Fig. 4 is a view in vertical section therethrough, taken on the line IV—IV of Fig. 3, Fig. 5 is a view, in side elevation of a clamping nut, and Fig. 6 is a bottom plan view of the clamping nut illustrated in Fig. 5.

A percolator 11 comprises a fluid container 12 having a pouring spout 13, a handle 14 and a hollow base portion 15. The bottom of the hollow base 15 is provided with a removable cover member 16 fitting tightly within a suitable opening. A plurality of heat-insulating supporting members 17 are secured to the bottom of the base 15. A removable cover member 18 having the usual glass top 19 is also provided.

A tubular member 21 is located at the bottom of the container 12 and extends thereinto through a suitable opening provided in the bottom of the container and the top of the base. A nut 22 is located on the upper portion of the tubular member 21 within the container 12 to clamp the tubular member securely, in its proper operative position and to provide a substantially water-tight structure. The member 21 is provided with an integral flange portion 23 intermediate its ends that provides a shoulder portion 24 to operatively engage the inner surface of the hollow base 15 and to co-operate with the nut 22 to securely hold the member in its proper operative position.

The member 21 and the integral flange 23 are preferably of metal having a relatively high heat conductivity, and the flange 23 is made relatively thin for a purpose to be hereinafter set forth.

A heating unit 25 of any suitable or desired type but in general, of a relatively flat construction, is located against the under surface of the integral flange member 23. Suitable means, such as thin plates of mica, are provided for insulating the resistor member of the heating unit 25 from the adjacent metal members. A clamping plate 26, of substantially the same surface area as the integral flange 23, is provided and is pressed against the lower surface of the heating unit 25 by a relatively large clamping nut 27 that operatively engages the lower screw threaded portion of the tubular member 21. The member 26 has a central opening 28 therein and is made of a metal that has a relatively less heat conductivity than the metal comprising the members 23 and 21. Whereas I prefer to employ copper for the members 21 and 23, I prefer to employ iron for the member 26. The nut 27 is provided with an integral annular extension 29 that fits within the opening 28. The clamping plate 26 is secured against the integral flanged portion 23 adjacent to each end thereof by relatively heavy, flat-head, machine screws 31.

A metal supporting plate 32 is located against the lower surface of the relatively large nut 27 and is held in place by a relatively thin clamping nut 33, which is mounted on the lower end of the screw-threaded portion of the member 21.

A terminal plate 34, of substantially flat V-shape, is insulatedly mounted against the supporting plate 32, at one edge thereof, a sheet 35, of mica, being located therebetween to provide suitable insulation. Insulated machine screws 36 secure the plate 34 against the plate 32. A terminal screw 37 is provided at one end of the member 34 to which one end of the resistor member of the heating unit 35 is connected as is illustrated in Figs. 2, 3 and 4 of the drawings. A similar machine screw 38 is provided at the other end of the member 34 to which one end of a supply circuit conductor (not shown) may be connected when the heating unit and the parts operatively associated therewith are mounted in their proper operative positions within the hollow base 15.

At the other side of the plate 32, there is mounted a terminal member 39 comprising a narrow and elongated metal bar that is clamped against the under surface of the plate 32 by an insulated machine screw 41, a plate 42 of mica being located between the bar 39 and the plate 32 to properly insulate these parts from each other. A machine screw 37 is provided adjacent to one end of the bar 39 to which the other end of the resistor member comprising a part of the heating unit 25 may be electrically connected.

A second terminal plate 43, of substantially Z-shape, has one of its end portions operatively engaging the lower surface of the plate 32, being held thereagainst by a machine screw 44 that is insulated therefrom. The mica plate 42 is of such extent and form as to insulate the member 43 from the plate 32.

A terminal screw 45 has screw-threaded engagement with a portion of the member 43 and the end of the other supply circuit conductor (not shown) may be secured against the plate or member 43 by means of the screw 45.

A fusible member 46 that comprises a thimble 47 has screw-threaded engagement with one portion of the member 43, as is illustrated more particularly in Fig. 2 of the drawing. An elongated rod 48 extends through the thimble 47 and has an integral head 49 that is adapted to normally operatively engage the plate 39 to close a circuit through the heating unit whenever the supply circuit conductors are connected to a suitable source of supply of electric energy.

A fusible member 51 surrounds a portion of the member 48 immediately adjacent to and below the head 49 and a spring member (not shown) located around the rod member 48 tends to retract the movement of the rod member 48 to disengage the head 49 thereof from its operative engagement of the plate 39 whenever the member 51 softens under the influence of an elevated temperature.

I do not desire to particularly claim the details of construction of the fusible member, as these have been disclosed and claimed in a co-pending application, Serial No. 567,447 filed by Ora A. Colby on June 10, 1922, and assigned to the Westinghouse Electric & Mfg. Company, to which application reference may be had for further details of construction and operation of these particular parts.

Means for holding the thimble 47 in any given position comprises a spring member 52 that is secured against the depending portion of the member 43 and that operatively engages the knurled head of the thimble 47.

In percolators employing heating units of the type disclosed and claimed in the hereinbefore mentioned application, it was found that the temperature at which the fusible member normally operated was relatively high and caused oxidization of the fusible means 51, thereby preventing its proper operation in case the fluid within the container 12 is completely evaporated. By making the tubular member 21 and the flange 23 of copper, whereby the heat is conducted therethrough relatively easily and quickly, and the lower flange 26 of iron, the greater part of the heat generated by the heating unit 25 flows into the flange member 23 and from there into such fluid as is located within the tubular member 21, causing rapid vaporization of a part of the fluid and expelling the rest of the fluid therefrom and up through a percolator tube 53 of the usual construction, the lower end of which carried a valve mechanism 54 of any suitable or desired type that co-operates with the tubular member 21 to cause the usual percolating action.

The fluid expelled from the vaporizing chamber within the tubular member 21 is forced up through the tube 53 and from there is permitted to trickle through a layer of ground coffee located within a suitable basket supported by the tube member 53, these latter elements not being shown, as they form no part of my invention.

During the percolating period, the temperature of the upper surface of the assembled structure illustrated in Figs. 2 and 4, is lower than that of the lower surface thereof by reason of the fact that water is located within the vaporizing chamber in the upper part of the tubular member 21 which therefore provides water cooling for the upper portion of these members and of the heating unit and further, because the lower plate 26 interposes a heat path of relatively low conductivity downwardly therefrom.

Some of the heat generated by the heating unit 25 will, of course, flow into the lower clamping plate 26 and the relatively large clamping nut 27 is effective to conduct it into the lower part of the tubular member 21 from where it can flow to the upper portion thereof and into the water located within the vaporizing chamber. The heat from the plate 26 flows into the nut 27 through the engaging flat portions thereof and flows from the nut 27 into the tubular member 21 through the screw-threaded engaging portions thereof, both of which provide heat paths of relatively high heat conductivity from the lower surface of the heating unit into the tubular member 21 and the vaporizing chamber constituted thereby, and thereby still further tend to reduce the temperature of the lower part of the heating unit structure and particularly of the supporting plate 32.

The fusible circuit interrupting means is designed to operate only in case of excessive temperatures within the container itself, as for instance if the water is evaporated, in which case the water cooling is no longer present, and substantially all of the heat will travel downwardly. The heat, therefore, flows into and through the clamping plate 32 and through the mica sheet 42 and causes a rise of temperature of the fusible member 51 which will soften after a predetermined length of time at a predetermined temperature and permit the spring member surrounding the rod 48 to cause disengagement of the heat 49 from the plate 39 thereby interrupting the circuit through the heating element and preventing damage of the percolator body in case the container runs dry.

The amount of material in the flange member 23 and the clamping plate 26 is made as small as is consistent with the necessities of mechanical strength and solidity of the entire structure in order to provide a heating unit structure of relatively small thermal capacity. This relatively small thermal capacity of the entire structure is effective in decreasing the length of time necessary to bring the fusible member 51 to such temperature as will cause softening thereof, whereby the possibility of damage to the body of the percolator is, of course, reduced.

The device embodying my invention thus provides a heating unit structure for an electric percolator that is effective to provide a heat path of relatively high conductivity from the lower surface of a flat heating unit located intermediate the ends of a depending tubular member and extending laterally thereof, to the tubular member itself.

The device embodying my invention further provides relatively light-weight members comprising a part of a heating unit structure that are effective to normally conduct the heat to the vaporizing chamber and that are also effective to quickly conduct the heat to a fusible circuit-interrupting means to cause interruption of the circuit before serious damage has been done to the body of the percolator in case of complete evaporation of water originally located therein.

Various modifications and changes may be made without departing from the spirit and scope of the invention. I desire therefore, that only such limitations shall be placed thereon as are imposed by the prior art.

I claim as my invention:

1. In a fluid heater, in combination, a fluid container, a tubular member depending therefrom and constituting a vaporizing chamber for said container and having a laterally-extending integral flange portion intermediate its ends, a flat heating element operatively engaging one surface of said flange portion, a clamping flange member below said heating element and spaced from said tubular member, and a clamping nut, mounted on said tubular member, of relatively large size and having an integral annular portion located within said clamping member, for holding said clamping flange member against said heating element and for simultaneously providing a relatively good heat path from said clamping flange member to said tubular member.

2. In a fluid heater, in combination, a fluid container, a tubular member depending therefrom and constituting a vaporizing chamber for said container and having a laterally-extending integral flange portion intermediate its ends, a clamping flange member below said integral flange, a flat heating element located between said flange members, a relatively large clamping nut on said tubular member, a supporting plate below said nut and clamping thereagainst, and a fusible circuit-controlling means mounted on said plate, said large clamping nut providing a heat path of relatively large area between said heating element and said circuit-controlling means.

3. In a fluid heater, in combination, a fluid container, a tubular member depending therefrom and constituting a vaporizing chamber for said container, a flat heating element operatively engaging said tubular member, a clamping plate for said heating element, a fusible circuit-controlling means operatively supported by said tubular member, and a clamping nut, of relatively large area mounted on said tubular member, for pressing said clamping plate against said heating element, and for providing a heat path of relatively large area from said clamping plate to said tubular member and also to said fusible means.

4. In a fluid heater, in combination, a fluid container, a tubular member depending therefrom and constituting a vaporizing chamber for said container, said tubular member comprising metal of high heat conductivity, a flat heating element operatively engaging said tubular member, a clamping plate, of relatively low heat-conductivity metal, and a clamping nut, of relatively high heat conductivity metal and of relatively large area, for pressing said clamping plate against said heating element and for providing a heat path of relatively high heat-conductivity from said heating element through said clamping plate to said tubular member.

5. In a fluid heater, in combination, a tubular member constituting a vaporizing chamber and an electric heating element operatively engaging said tubular member and having a plurality of heat paths of different heat conductivity thereto.

6. In an electric fluid heater, in combination, a tubular member constituting a vaporizing chamber, a heating element, and a plurality of flange members for holding said heating element in heat-conducting relation to said tubular member and for providing a plurality of heat paths of different heat-conductivity thereto.

7. In a fluid heater, in combination, a tubular member constituting a vaporizing chamber, an electric heating element, a thermal means for controlling the energization of said heating element, and a plurality of flange members for holding said heating element in heat conducting relation to said tubular member and for providing a heat path of lower heat-conductivity to said thermal controlling means than to said tubular member.

In testimony whereof I have hereunto subscribed my name this 15th day of February, 1924.

VICTOR G. VAUGHAN.